US005116591A

United States Patent [19]

Witter

[11] Patent Number: 5,116,591
[45] Date of Patent: May 26, 1992

[54] METHOD AND APPARATUS FOR COMBINING FLUIDS

[75] Inventor: James S. Witter, Clarence Center, N.Y.

[73] Assignee: Mollenberg-Betz, Inc., Buffalo, N.Y.

[21] Appl. No.: 336,759

[22] Filed: Apr. 12, 1989

[51] Int. Cl.[5] ........................ C01C 1/00; G05B 9/05; G05D 16/00

[52] U.S. Cl. ........................ 423/352; 422/113; 422/117; 422/242; 423/210; 423/238; 423/659

[58] Field of Search ........................ 422/113, 117, 242; 423/352, 659, 210

[56] References Cited

U.S. PATENT DOCUMENTS

| | | | |
|---|---|---|---|
| 2,508,238 | 5/1950 | Fagen | 422/113 |
| 3,679,369 | 7/1972 | Hashimoto et al. | 422/117 |
| 3,969,077 | 7/1976 | Hill | 422/117 |
| 4,240,798 | 12/1980 | Wendelin et al. | 422/117 |
| 4,291,991 | 9/1981 | Schulte et al. | 422/113 |
| 4,322,224 | 3/1982 | Roth | 422/117 |
| 4,476,097 | 10/1984 | Van Pool et al. | 422/113 |
| 4,622,209 | 11/1986 | Nardi et al. | 422/117 |
| 4,711,096 | 12/1987 | Krantz | 62/129 |

FOREIGN PATENT DOCUMENTS

| | | | |
|---|---|---|---|
| 0018881 | 11/1980 | European Pat. Off. | 422/117 |
| 182554 | 10/1983 | Japan | 436/113 |
| 196473 | 10/1985 | Japan | 422/117 |

*Primary Examiner*—Wayne A. Langel
*Attorney, Agent, or Firm*—Sommer, Oliverio & Sommer

[57] ABSTRACT

A spray combining apparatus for use at the outlet of a fluid collection system (10) includes an outlet pipe (11) containing a diffuser and atomizer (15) adjacent an outlet opening (18). A conical rain cap (19) is mounted vertically above the outlet opening. A downwardly-facing nipple and spray nozzle (22) is positioned above the rain cap. The nozzle is supplied with a pressurized second fluid from a source (26). If first fluid is detected in the outlet, the second fluid is discharged through the spray nozzle in a selected enveloping pattern toward the outlet. As the atomized first fluid is emitted from the outlet opening, it is combined with the enveloping spray of the second fluid. The resulting neutralized or "washed" product is either suspended in the air, or is contained in the vicinity of the outlet.

4 Claims, 1 Drawing Sheet

METHOD AND APPARATUS FOR COMBINING FLUIDS

TECHNICAL FIELD

The present invention relates generally to methods and apparatus for detecting and containing fluid leaks and spills, and, more particularly, to an improved system for neutralizing or combining leaks of toxic or noxious fluids prior to venting such fluids into the atmosphere.

BACKGROUND ART

Industrial processes often require to conveyance of fluids through piping networks as part of normal manufacturing operations. These piping networks often carry noxious or toxic fluids, (e.g., ammonia, chlorine, etc.) through areas in manufacturing plants where people are regularly present. Inadvertent exposure to these fluids, whether in the form of gases or liquid, may prove harmful or irritating to such people and the environment, may disrupt manufacturing processes and may contaminate work-in-process or finished product. As a result, numerous detection and containment systems are believed to have been developed in the prior art to sense, purge, collect and discharge potentially harmful leaked fluids from manufacturing facilities.

For example, U.S. Pat. No. 4,711,096 ("Leak Detection and Refrigerant Purge System") appears to disclose a system for sensing gaseous ammonia leaks in commercial refrigeration systems, and for automatically collecting and venting such leaked ammonia away from the refrigerated environment. This is apparently intended to avoid contamination of the stored product, and to reduce the possibility of human exposure to gaseous ammonia suspended in the air.

In practice, dilution and collection systems are believed to simply collect the leaked fluids, and to vent the same directly into the air outside the operating facility at a location distant from both product and people (e.g., on the roof of a plant, at a remote end of a building, etc.). These systems, however, generally do not detoxify or neutralize the leaked fluid before being vented into the air.

For example, ammonia refrigerant ($NH_3$) has a molecular weight (i.e., 17) significantly less than that of ambient air (i.e., 29). Thus, gaseous ammonia vented into the air will remain suspended in the air, and may migrate unpredictably to surrounding areas, possible creating a noxious and potentially harmful situation. In some cases, venting of the gaseous ammonia directly into the air may result in an emergency response from local fire and police departments in an attempt to prevent further migration of the un-neutralized ammonia gas into sewers and populated areas. In general, ammonia ($NH_3$) reacts with water ($H_2O$) to form what is typically referred to as "household liquid ammonia" ($NH_4OH$). Household ammonia, although odorous, is not generally harmful unless orally ingested or subjected to variations in pressure or temperature. However, the response of local police and fire departments is often accompanied by attempts to "wash" or neutralize the escaped ammonia gas with water sprayed by fire hoses. As a practical matter, the discharged gaseous ammonia and the location of the outlet vent are simply sprayed with a large volume of water in the hope of neutralizing the gaseous ammonia prior to further migration through the air. Although such neutralizing or "washing" of ammonia with water is theoretically a sound response, the method of response is generally inefficient. For example, even assuming that an ammonia leak is promptly detected, there is time lag between the time the ammonia begins to escape and the appearance by the local or facility fire departments on the scene. In other words, the response normally comes after substantial quantities of refrigerant have been leaked, and have possibly migrated to an area distant from the source of the emission. Secondly, uncontrolled or unmeasured spraying with water of the outlet vent, the surrounding air or a migrating gaseous ammonia cloud, is typically inefficient, and will likely not result in complete neutralization of the vented ammonia. Third, rather than the desired product of the neutralization reaction (i.e., $NH_4OH$) being concentrated and contained in a relatively small area immediately around the outlet vent, such reaction product as is formed will be typically spread over a much wider area, depending upon the extend and severity of the leak, the lag in the emergency response time, and the effectiveness of the response.

Upon information and belief, the prior art has recognized these problems, but no known solution has proved to be adequate. For example, one known solution is to provide a containment tank filled with water and through which leaked ammonia gas is passed. These tanks, possibly containing on the order of 20,000 to 30,000 gallons of water, are bulky, unsightly, and often expensive. Moreover, care must be taken to maintain the integrity of the tank and the volume of water therein, which must be proportional to the maximum possible ammonia leakage in order to be effective. Moreover, appurtenant mechanical systems (e.g., piping, pumps, sight gauges, and the like) supporting the tank must be maintained. In addition to these factors, the tanks are also subject to temperature elevation with leakage of even small quantities of ammonia. For example, neutralization of ammonia to a 10% solution by weight may result in an evaluation of water temperature of over $100°$ F. Moreover, at higher temperatures, the solubility of ammonia in water decreases, presenting the question of whether the volume of water in the tank is adequate to react with the leaked ammonia at the elevated temperatures. In addition, intimate thoroughly-mixed contact between the ammonia and water is critical for complete neutralization to occur. A simple inlet at a tank bottom may result in ammonia bubbles rising upwardly to the water surface without complete neutralization or interaction. This can lead to an uncombined ammonia layer at the surface of the water. As a result, pressure build-up and possible explosion, as well as gaseous ammonia being leaked into the atmosphere, remain as possibilities.

Thus, the known prior art is believed to have failed to adequately resolve the need for a simple and inexpensive, yet reliable system for effectively neutralizing leaks of noxious or toxic fluids without undue delay.

DISCLOSURE OF THE INVENTION

This invention broadly provides improved methods and apparatus for combining fluids such as ammonia and water.

In one aspect, the invention provides an improvement for use in an existing system for venting a first fluid (e.g., ammonia or the like) through an outlet. The improvement may include a source of a second fluid (e.g., water), and discharge means, such as a spray nozzle, arranged to be supplied with the second fluid from the source, and operatively arranged to selectively discharge the second fluid at or toward the outlet whenever the first fluid is vented therethrough. Thus, the vented first fluid will be thoroughly combined with the discharged second fluid.

In use, such apparatus performs a unique method of combining a first fluid (e.g., ammonia) with a second fluid (e.g., water), which method includes the steps of: venting the first fluid at an outlet; sensing or detecting the presence of the first fluid at the outlet; providing a source of second fluid; selectively supplying second fluid from the source when the presence of the first fluid is sensed or detected at the outlet; and discharging such supplied second fluid at or toward the outlet in such a manner as to cause the first and second fluids to be thoroughly combined.

With parenthetical reference to the corresponding parts, portions or surfaces of the preferred embodiment disclosed herein, the improved apparatus may broadly comprise an outlet pipe (e.g., 11) from a first fluid collection system, such outlet having a plurality of connected conduit section including a neck section (e.g., 12) of one diameter and an end section (e.g., 14) of an enlarged diameter. A diffuser or atomizer (e.g., 15) is transversely arranged within the outlet section. A conical rain cap (e.g., 19) is operatively positioned over the outlet opening (e.g., 18) to prevent extraneous matter from entering the outlet from above. A spray nozzle (e.g., 22) is positioned directly above the conical rain cap and outlet opening, and is arranged to be supplied with water from a source (e.g., 26) through a supply pipe (e.g., 24), such nozzle being so selected and configured as to be capable of selectively spraying water to completely surround or envelope the area around the outlet, through which vented ammonia must pass, with water. The water spray may be automatically actuated by a sensor/controller (e.g., 28, 30) upon detection of ammonia in the outlet pipe.

Accordingly, the general object of the invention is to provide improved apparatus for combining first and second fluids at the outlet of a fluid collection system.

Another object is to provide an improved vent for use in a fluid collection system which improved vent is capable of combining and neutralizing a vented fluid at the system outlet prior to dispersion into the atmosphere.

Another object is to provide an improved fluid combining and neutralizing system that is actuated automatically and immediately upon detection of the second fluid in the outlet.

Still another object is to provide improved combining and neutralizing apparatus which is readily adaptable to a wide variety of collection systems and serviced fluids.

These and other objects and advantages will become apparent from the foregoing and ongoing written specification, the drawings, and the appended claims.

MODE(S) OF CARRYING OUT THE INVENTION

Figure 2:
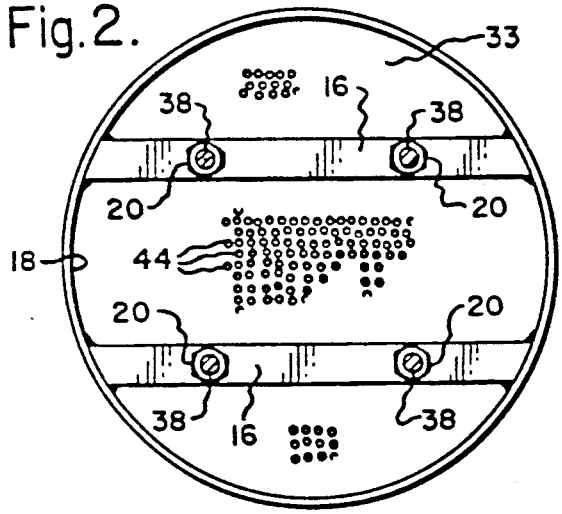
FIG. 2 is a fragmentary transverse horizontal sectional view thereof, taken generally on line 2—2 of FIG. 1, showing the atomizer and support member bars in top plan.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, arrangement of parts, etc.) together with the specification, and are to be considered a portion of the entire written description of this invention. As used in the following description, the terms "horizontal," "vertical", "left", "right", "up" and "down," as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Referring now to the drawings, this invention provides an improvement for use with a fluid collection and venting system, and is particularly adapted for use in neutralizing gaseous ammonia refrigerant prior to venting the same to the atmosphere. More particularly, the improvement provides a fluid combining apparatus for neutralizing, combining or "washing" excess or leaked ammonia gas, which has been collected and which is to be vented through an outlet of such system, with water, prior to emission. However, it should be clearly understood that the invention is not limited to use with these two serviced fluids. Indeed, the improvement can be readily adapted, modified and configured by those skilled in the art to collection systems handling other fluids, and to other collection systems as well. In the following description, the improvement will be described as associated with an ammonia refrigeration system, which provides for venting of inadvertently-leaked gaseous ammonia refrigerant to the atmosphere.

Figure 1:
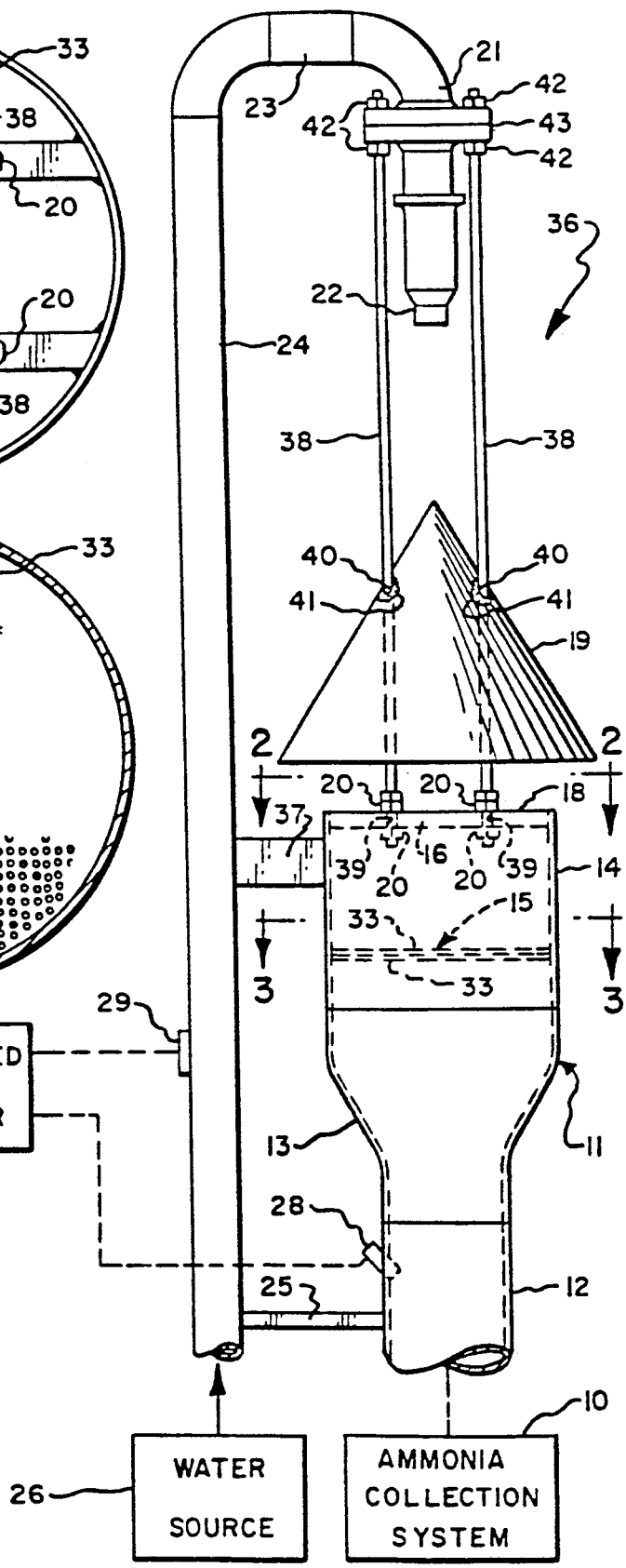
FIG. 1 is a side elevation of the improved apparatus, showing the outlet portion of the collection system, and also showing the controlled actuator and fluid source in schematic block form.

As best shown in FIG. 1, the improvement generally indicated at 36, is provided at the terminal end of an outlet conduit 11 of an ammonia collection system 10.

The illustrated marginal end portion of the outlet conduit is shown as having a lowermost cylindrical section 12, and intermediate diffuser section 13, and an uppermost cylindrical section 14 of enlarged diameter. The uppermost section terminates in an outlet opening 18.

Figure 3:
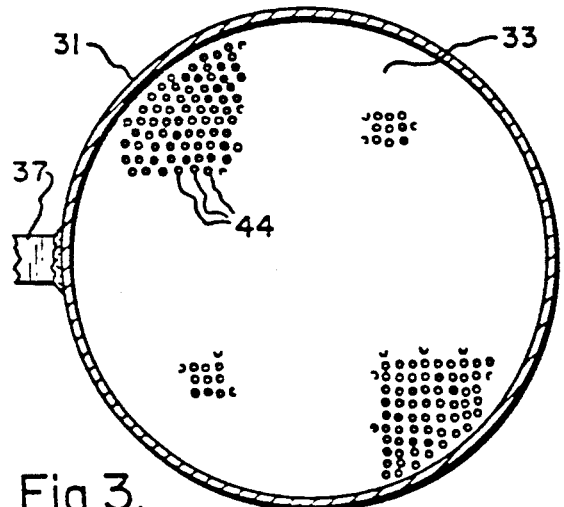
FIG. 3 is a fragmentary transverse horizontal sectional view thereof, taken generally on line 3—3 of FIG. 1, showing the atomizer in top plan.

An atomizer 15 is operatively positioned within the uppermost pipe section for insuring that the ammonia will be discharged from the outlet in gaseous form. As best shown in FIGS. 2 and 3, the atomizer consists of two substantially-identical parallel, horizontal, vertically-spaced circular plates, severally indicated at 33, which are arranged so as to be transverse of the longitudinal axis of the upper section. Each plate includes a circular support frame 31 having inwardly-facing C- or channel-shaped cross-section not shown), and having an outer diameter slightly less than the inside diameter of end section 14 of the outlet, to allow the frame and plate to be removably positioned within such end section. The support frame 31 peripherally bounds and supports a horizontally-disposed screen plate 33 having a plurality of vertical through-holes, severally indicated at 44, of selected spacing and size for effectively atomizing the ammonia to a gaseous form as it travels upwardly therethrough toward the outlet.

A pair of horizontally-spaced parallel bars, severally indicated at 16, are shown as extending across the inscribed area of the upper section and are affixed to the inside wall thereof of the outlet, above the upper atomizer and at the outlet opening 18. Each support member bar includes two vertical through-holes, severally indicated at 39, spaced substantially equally along its length. The lower marginal end portion of support rods 38, 38 are shown as having been passed through holes 39, 39 and are secured in such position by means of nuts, severally indicated at 20.

A conical rain cap 19 is spaced above outlet opening 18, and is secured to intermediate portions of the support rods, which penetrate openings 40 in such cap. The conical rain cap is secured to the support rods by peripheral weldments 41, or by other suitable attachment means, and is positioned to protectively cover the outlet from above, while permitting the gaseous ammonia to be vented through the projected space between the outlet opening and the rain cap.

A supply pipe 24 is shown as being arranged parallel to the outlet and support rods, and has its lower end portion (not shown) connected to and communicating with a water source, generally indicated at 26. The supply pipe is held in this operative position relative to the outlet, by means of attachment bars 25, 37. The upper marginal end portion of the supply pipe communicates with the left end of an inverted U-shaped pipe 23. The right end of pipe 23 communicates with a nipple and downwardly-facing spray nozzle 22. The horizontal extend of the inverted U-shaped portion 23 is selected so that the spray nozzle is substantially centered over the outlet opening 18, and rain cap 19, thereby insuring that a downwardly-directed water spray discharged through the nozzle 22 will completely envelope and surround the outlet. A flange-like support 43 encases the circumference of downwardly-facing section 21 of the U-shaped pipe, for securing the upper marginal threaded end portion of support rods 38, 38 with lock nuts 42. Thus, the support rods serve to vertically align the spray nozzle and the conical rain cap relative to the outlet opening, thereby insuring the selected spray pattern will surround and envelope the outlet.

An ammonia sensor 28 is arranged in the outlet conduit pipe section 12. This sensor, upon detecting the presence of ammonia in the outlet, signals an actuator 30, which, in turn, opens vale 29 in the supply pipe, thereby permitting the water from the source to travel upwardly through the length of the supply pipe and the inverted U-shaped portion, and be discharged downwardly through the spray nozzle toward the outlet from a position above the conical rain cap.

Thus, leaked or excess gaseous ammonia is collected by the collection system 10, and is directed toward and vented through the outlet. When the presence of ammonia is detected in the outlet by the sensor, the actuator selectively opens valve 29 and cause a water spray to be discharged through the nozzle toward and the outlet opening, thereby continuously enveloping a selected area around and about the outlet opening. As the ammonia travels up the outlet, it is atomized and diffused by the atomizer to insure that it is gaseous form before being vented through the outlet opening into the air. Upon such emission, however, the ammonia gas is contacted by the enveloping water spray discharged by the nozzle and, as a result, is neutralized or "washed" thereby prior to being discharged into the atmosphere. This "washing" causes liquid ammonia (e.g., $NH_4OH$) having a molecular weight greater than that of the ambient air to be formed, and, accordingly, such reaction product does not become suspended in the air, and is confined and contained to the area immediately about the outlet pipe.

MODIFICATIONS

The present invention contemplates that many possible changes and modifications may be made. For example, the volume of water and/or the configuration of the spray or fog pattern emitted by the nozzle, may be varied in accordance with the actual amount of leaked ammonia, or size of the refrigerant system being vented. Moreover, multiple spray nozzles, spray configurations or directional configurations (e.g., horizontal sprays, etc.) may also be employed, depending upon the overall collection system and operating system conditions. Spraying toward or at the outlet from above, is only one selected embodiment. Persons skilled in this art will readily appreciate that multiple spray patterns and/or directions may be employed to achieve like results. Similarly, the water source and supply pipe need not be adjacent or directly connected to the outlet pipe. For example, a single water source may supply multiple supply pipes in various positions and configurations, depending upon the physical layout and location of outlet vents in the particular facility. Such water source may be pressurized by a suitable pump, as desired.

In addition, although the preferred embodiment has been described in terms of an ammonia-water system, the improvement specifically contemplates that the improved apparatus may be used with other phases (i.e., liquids and gases) and types of fluids (i.e., toxic, noxious, etc.). An appropriate neutralizing or "washing" fluid is selected to achieve a desired result depending on the chemical characteristics of the first fluid which may be vented through the outlet. For example, it may be desirable in some applications to spray an emitted gas with another gas, resulting in a less-toxic or less-noxious product that may be disbursed into the air with a reduced potential harm to product, the environment or people.

Moreover, although the preferred embodiment discloses a sensor and a normally-closed valve adapted to be selectively opened by a controller, the improvement contemplates that the second fluid flow may be manually enabled and/or monitored without automatic control. Similarly, the improvement may be used with suitable drainage or other containment means to dispose of the reaction product, if heavier than air.

Therefore, while the preferred embodiment of the improved spray combining apparatus has been shown and described, and several possible modifications and changes thereof discussed, persons skilled in this art will readily appreciate the various additional changes and modifications may be made without departing from the spirit of the invention, as defined and differentiated by the following claims.

I claim:

1. In a refrigeration system having a first outlet through which ammonia refrigerant, $NH_3$, is arranged to be vented, the improvement comprising:

a second outlet having two ends and connected, at its one end, to a source of water and having at its other end, a connected spray nozzle, said spray nozzle positioned over said first outlet for spraying water thereover;

dispersion means, arranged within said first outlet for diffusing said ammonia vented through said outlet;

an ammonia sensor, interposed within said first outlet for sensing the presence of ammonia refrigerant in said first outlet;

a capping means arranged to allow dispersion and venting of said ammonia from said first outlet, while simultaneously covering said first outlet, said capping means further arranged to be interposed between said second outlet spray nozzle and said first outlet and further adapted to provide a water spray pattern enveloping said first outlet upon venting of said ammonia and spraying of said water, whereby said ammonia refrigerant is combined with said water at said outlet.

2. The device according to claim 1 wherein said dispersion means is an atomizer.

3. The device according to claim 1 wherein said capping means is a conical cap.

4. In an ammonia refrigeration system, the method of combining vented ammonia refrigerant with water at an outlet, comprising the steps of:

venting ammonia from said refrigeration system at a first outlet;

automatically sensing the presence of ammonia refrigerant in said first outlet;

providing a source of water separate from said first outlet;

providing a second outlet communicating with said source of water and positioned adjacent said first outlet;

discharging said water through said second outlet toward said first outlet upon the sensing of ammonia refrigerant in said first outlet;

providing a spray nozzle at one end of said second outlet for spraying water therefrom;

providing a conical cap disposed between said second outlet spray nozzle and said first outlet for defining a spray pattern enveloping said first outlet;

spraying said water from said second outlet over said conical cap toward said first outlet;

providing an atomizer within said first outlet for dispersing said ammonia refrigerant;

venting said ammonia from said first outlet;

combining said ammonia refrigerant with said water in the area of said first outlet;

whereby said water and ammonia refrigerant are combined to form a reaction product having a molecular weight less than that of ambient air.

* * * * *